(12) United States Patent
Finzel et al.

(10) Patent No.: US 6,236,798 B1
(45) Date of Patent: May 22, 2001

(54) ELONGATED PROTECTIVE PROFILE FOR PROTECTING A CABLE INSTALLED IN AN INSTALLATION CHANNEL AND AN APPARATUS FOR INSTALLING THE PROFILE

(75) Inventors: Lothar Finzel, Unterschleissheim; Ernst Mayr, Starnberg; Thomas Mueller, Sonneberg; Heinz Diermeier, Munich, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/260,906

(22) Filed: Mar. 2, 1999

(30) Foreign Application Priority Data

Mar. 3, 1998 (DE) .................................... 198 08 945

(51) Int. Cl.[7] ........................................................ G02B 6/36
(52) U.S. Cl. ............................. 385/147; 385/86; 385/136
(58) Field of Search ...................................... 385/147, 136, 385/137, 69, 86, 87

(56) References Cited

U.S. PATENT DOCUMENTS

| 3,570,379 | | 3/1971 | Johnson . | |
|---|---|---|---|---|
| 5,195,153 | * | 3/1993 | Finzel | 385/70 |
| 5,751,876 | * | 5/1998 | Ikesugi et al. | 385/86 |

FOREIGN PATENT DOCUMENTS

WO 97/20236    6/1997    (WO) .

* cited by examiner

*Primary Examiner*—Hung N. Ngo
(74) *Attorney, Agent, or Firm*—Schiff Hardin & Waite

(57) ABSTRACT

To protect a waveguide or cable in an installation channel, a protective profile is inserted into the channel and has a substantially U-shaped cross-section when installed. To install this in the channel, an apparatus having a drum with a profile wound thereon has the profile unwound and guided by guide rolls to a press roll, which presses the profile into the channel to the desired depth. The profile can have a center portion provided with embedded reinforcing elements or even optical or electrical leads.

23 Claims, 4 Drawing Sheets

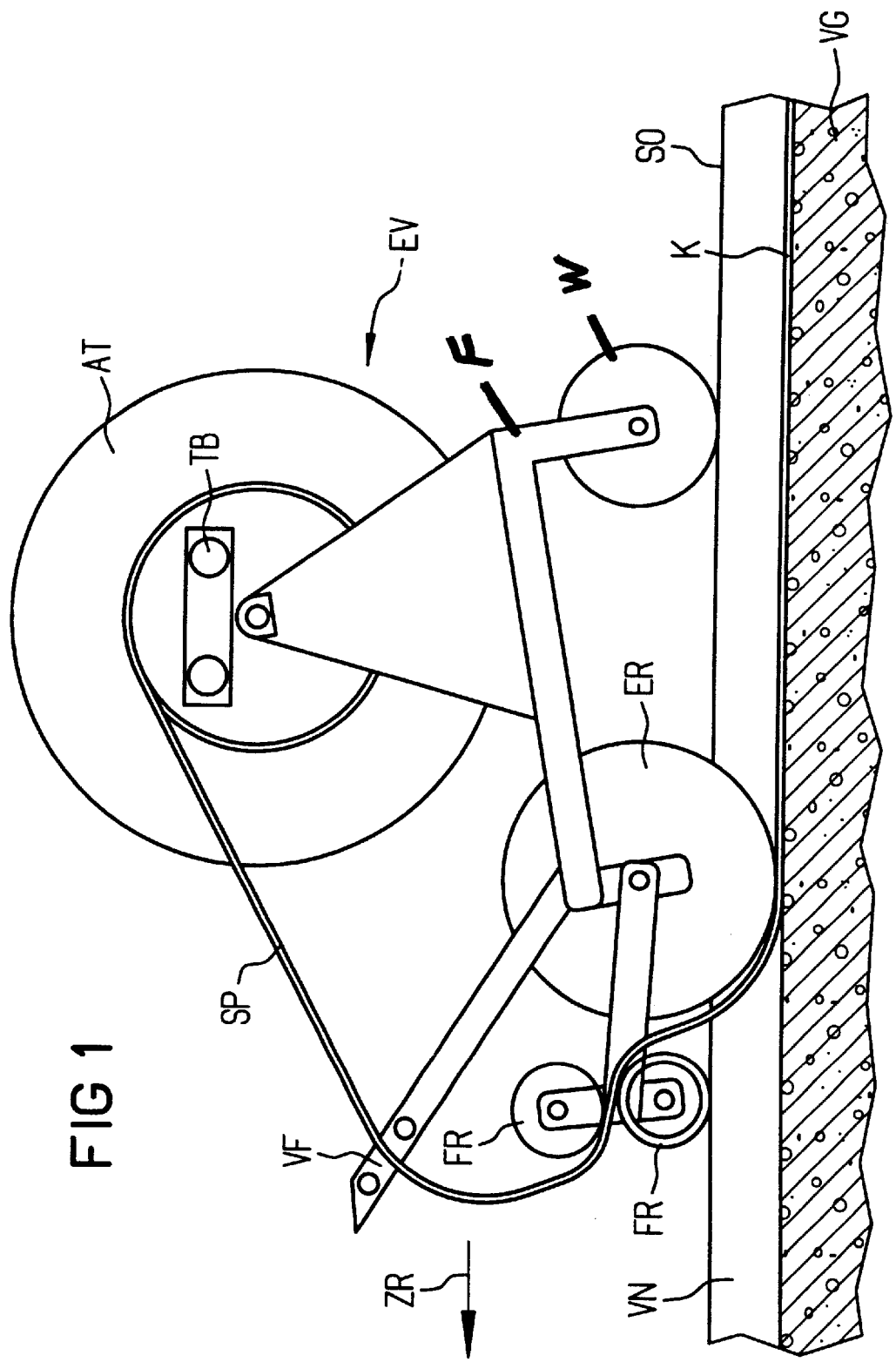

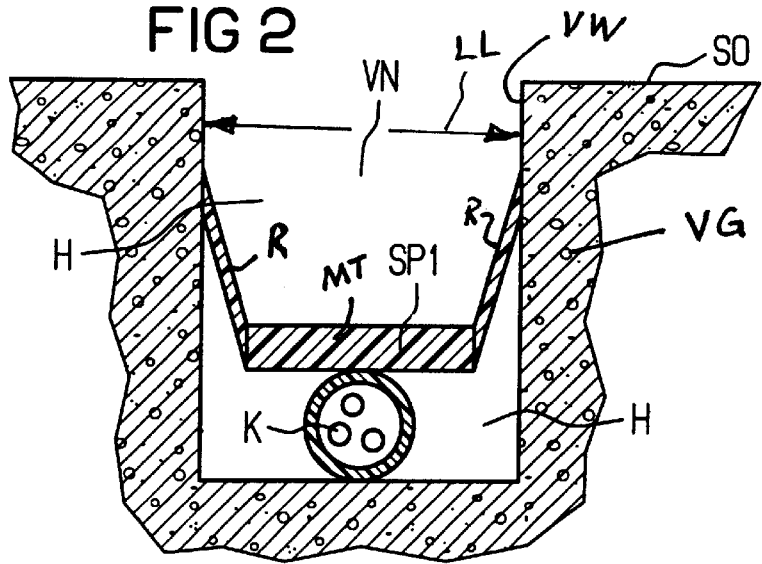
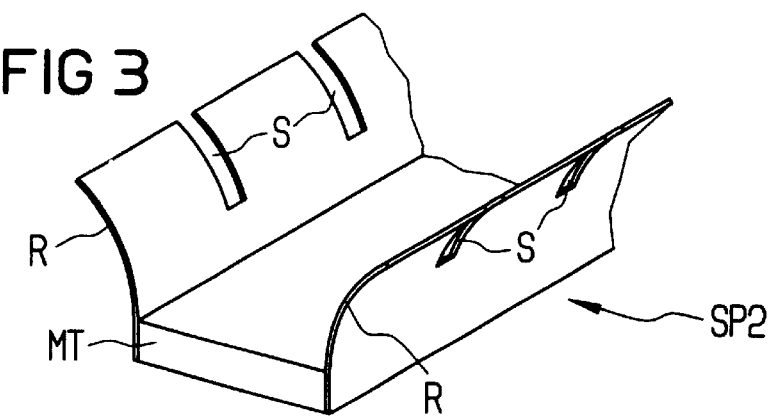
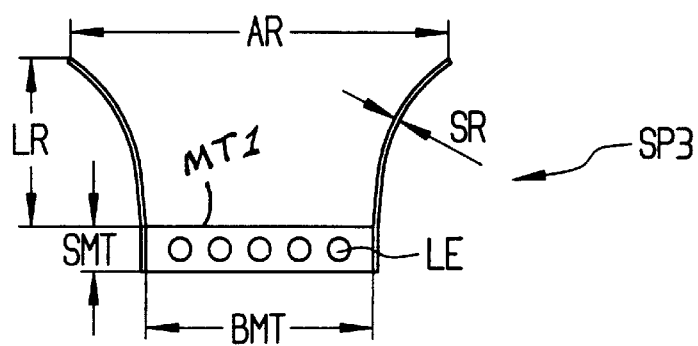

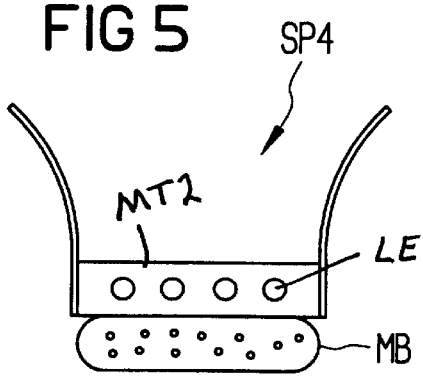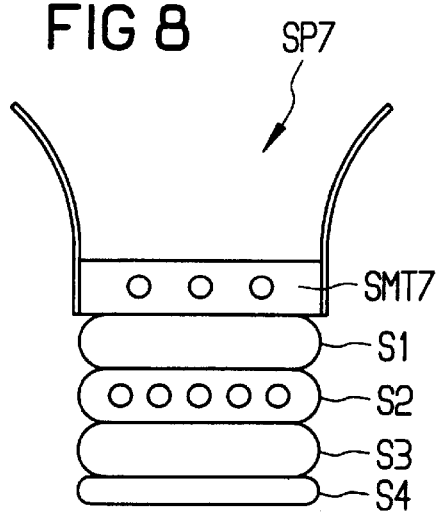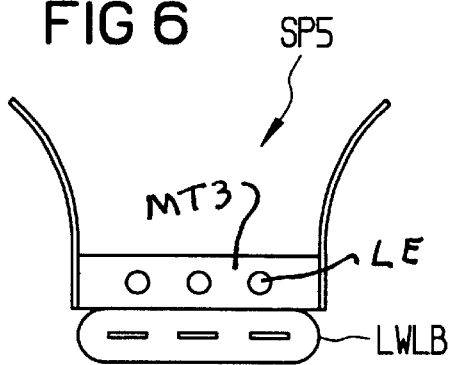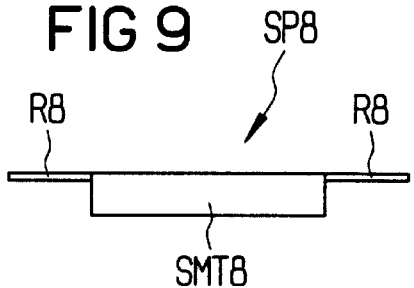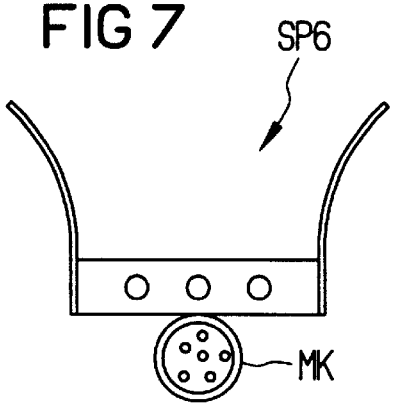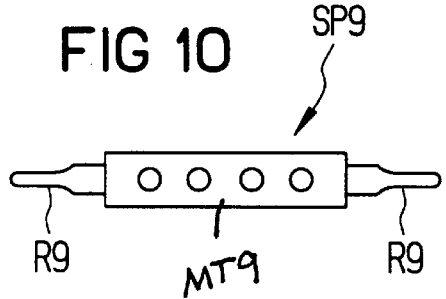

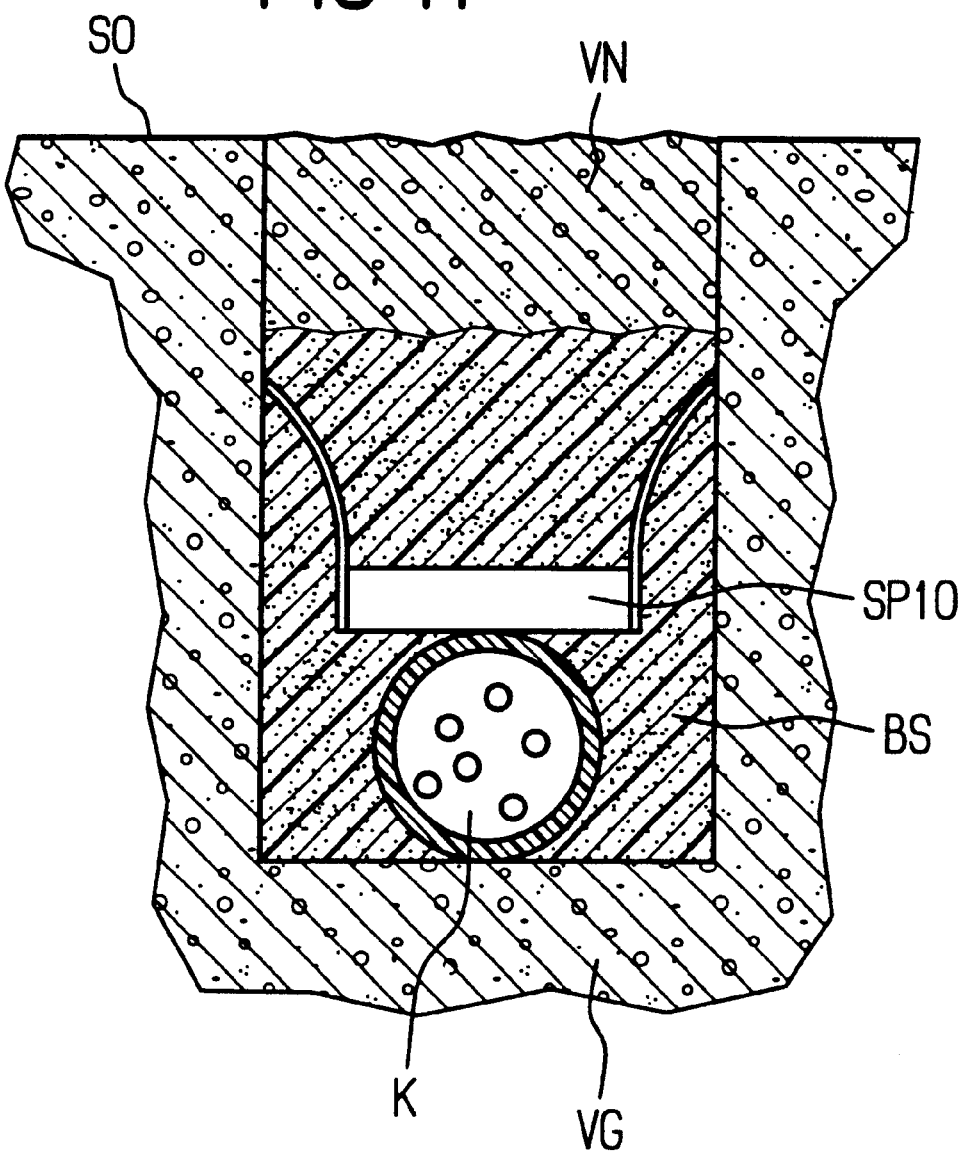

ELONGATED PROTECTIVE PROFILE FOR PROTECTING A CABLE INSTALLED IN AN INSTALLATION CHANNEL AND AN APPARATUS FOR INSTALLING THE PROFILE

BACKGROUND OF THE INVENTION

The present invention is directed to an elongated protective profile for installation in a cable channel on top of the cable for protecting the cable and to an apparatus for installing the profile in the installation channel.

WO 97/20236 teaches a method of installing an optical cable in a solid installation base, which includes forming a channel or groove in the material and then inserting the cable in this milled channel or groove. Above the cable, an elongated hold-down device, which is constructed in a U-shaped fashion, is used with the legs being laterally braced against the channel wall. The insertion of the hold-down device, which also serves for protection, occurs more or less by manual actuation.

SUMMARY OF THE INVENTION

The object of the present invention is to create an insertion apparatus for elongated protective profiles, which can be easily inserted into an installation channel by the apparatus. It is also an object to design a suitable protective profile for this insertion apparatus.

The stated object is achieved with an insertion apparatus which includes a frame, a feed drum with the elongated protective profile being wound thereon and said drum being mounted for rotation in the frame, an arrangement for moving the apparatus along the installation channel, a press roll which engages the profile and inserts it into the installation channel, and a pair of guide rolls for positioning the protective profile after it was unwound from the feed drum and guiding the profile to the press roll, which inserts the profile into the channel as the apparatus moves thereon. The protective profile preferably comprises a center portion between two flexible margin portions, and the flexible margin portions can bend in a direction opposite to an insertion direction so that the profile assumes a U-shaped cross-section when inserted in the channel, with the center portion being located at the bight portion and the margin portions being the legs extending therefrom.

The insertion of the protective profile with the aid of the inventive insertion apparatus has several advantages. For example, the protective profile is evenly and continuously led into the channel and profile structures that are particularly suited for this are utilized, such as U-shaped profiles with flexible legs. In addition, the protective profiles are designed so that they can be delivered wound on a feed drum and used in the insertion apparatus. The utilized feed drum is provided with a brake so that the drawing of the profile from the feed drum can be controlled. In pressing of the protective profile by means of a press roll, it is guaranteed that the protective profile is properly positioned and fixed with the lateral margins of the protective profile being bent so that they spread against the wall of the installation channel. This guarantees that the protective profile can no longer move from the installation channel independently. The filling with a correspondingly suitable filler, such as a flexible filling compound or swelling agent like threads, formed fabrics or filling compounds where swelling occurs prior to or during the insertion of the protective profile. This produces a protection against water penetration. What are known as microcables, which consist of a tube in which light waveguides are loosely placed, are preferably utilized for this type of installation.

The protective profile can consist not only of metal but also of plastic and simultaneously serves as mechanical protection against external influences. Glass-fiber- or aramide-yarn-reinforced plastic is preferably utilized as a material for the protective profile, and this plastic preferably is extrusion-coated with a high-density polyethylene (HDPE). Such a protective profile can be produced in great lengths and can be easily wound on the feed drum. If a protective profile made of metal or of plastic with elongated inserts or liners of metal wires is utilized, it can also be employed as a grounding wire or lead or as an electrical conductor. In addition, longitudinally extending copper strands or light waveguides can be placed in the plastic protective profile, and these strands are suitable for the supervision of the cable run.

The following advantages result from such an inventive protective profile:
The cable installed in the channel is fixed, the residual space of the channel preferably being filled with bituminous sand;
The cable is protected against mechanical influences;
The cable is protected against heat influence in the filling of the installation channel with the hot bituminous material;
In case of repair, the installation channel can be easily opened, without stressing the cable, by merely pulling out the protective profile; and
Given additional insertions of wires in the protective profile, corresponding transmissions can also occur.

Given a microcable with a metal tube and a corresponding outer insulation, a protective profile made of either metal or plastic with inserted wires can serve as a return line. Wires embedded in a protective profile enable conducting power from a power supply.

The protective profile can be attached directly to a microcable, so that a single insertion unit is formed.

Forms which are suitable as profile forms are, above, all, those which spread out against the wall of the installation channel subsequent to being pressed into the channel so that a fixing immediately occurs.

The insertion apparatus according to the present invention can be designed as a self-propelled unit or can be installed in a cable carriage or in a carriage that contains the filling agent. Bituminous sand is particularly well suited as a filling agent for the installation channel.

The insertion apparatus appropriately also contains apparatuses for inserting swelling agents and/or filling agents, so that a plurality of processes can occur in one pass along the channel with each item being successively applied. In other words, a filling compound or swelling agent can be inserted in the channel prior to inserting the protective profile.

In addition, the feed drum is respectively designed so that it is suitable for winding up the individual protective profiles having different various structures.

Other advantages and features of the invention will be readily apparent from the following description of the preferred embodiments, the drawings and claims.

BRIEF DESCRIPTION OF THE DRAWINGS

FIG. 1 is a side view of an insertion apparatus for inserting the protective profile of the present invention;

FIG. 2 is a cross-sectional view of an installation channel with a cable disposed therein and with the protective profile arranged above the cable;

FIG. 3 is a perspective view of a modification of the protective profile according to the present invention;

FIG. 4 is an end view of another modification of a protective profile which has inserted longitudinal elements;

FIG. 5 is an end view of an embodiment of a protective profile in accordance with the present invention with a fixed oval maxibundle;

FIG. 6 is an end view of another modification of the protective profile which is affixed to the light waveguide bundle;

FIG. 7 is an end view of a modification of the protective profile which has been affixed to a microcable;

FIG. 8 is an end view of yet another embodiment of a protective profile comprised of a multi-level protective profile;

FIG. 9 is an end view of another modification of a protective profile with protruding margins;

FIG. 10 is an end view of a further modification of a protective profile with protruding margins; and FIG. 11 is a cross-sectional view of an installation channel having a waveguide cable inserted therein, a protective profile and various filling materials.

DESCRIPTION OF THE PREFERRED EMBODIMENTS

The principles of the present invention are particularly useful when incorporated in an insertion apparatus, generally indicated at EV in FIG. 1. The apparatus includes a frame F, which is illustrated as being mounted on rollers or wheels, such as a pressing roller or press roll ER and transfer rollers or wheels W. The frame F has a feed drum AT mounted for rotation thereon. The feed drum AT has a protective profile SP wound thereon and this is unwound from the feed drum to be installed in the channel VN, which has been cut or milled into an installation base VG. The protective sheath SP is led via pre-guides VF to two guide rollers FR, between which it passes, and is correspondingly positioned for installation into the channel VN. The protective profile is subsequently pressed into the installation channel by the pressing roller ER and is fixed inside this installation channel VN above the previously installed cable K by the curved margins spreading out against the walls of the installation channel. During this process, the installation apparatus EV is pulled or, respectively, driven along the street surface SO over the installation channel VN, as indicated by the direction ZR. To control the insertion of the protective profile, the feed drum AT is provided with a brake arrangement TB that controls the unwinding of the profile.

As illustrated in FIG. 2, the channel VN, which is cut or milled into the installation base material VG has side walls VW. When inserting the protective profile SP1 in an installation channel VN, the protective profile SP1 will have a U-shaped configuration, as illustrated in FIG. 2. As illustrated, the protective profile has a center part or portion MT with a pair of margin portions R extending from each side, which margin portions spread into engagement with the side walls VW of the channel VN and hold the protective profile above a cable K, which is in the hollow space H which preferably can be filled with a filling agent.

A modification of the protective profile is illustrated at SP2 in FIG. 3 and consists of a center part MT, which protects the cable, and lateral margins or portions R. The margins are flexible so that they can be wound on the feed reel or drum. The margins are thus provided with slots or slits S, for example, so that the flexibility of the whole arrangement is improved for the winding.

An embodiment of the protective profile is generally indicated at SP3 in FIG. 4 and has embedded longitudinal elements LE inserted in a center portion MT1, which elements serve for reinforcement and also, given suitable construction, can be current conductors or transmission lines. For an exemplary embodiment wherein an installation channel has a width LL of 10 mm, the profile has the following dimensions: a width BMT of the center part of between 8 mm and 9 mm and a thickness SMT of around 3 mm. Each of the flexible margin portions R will have a width LR of approximately 7 mm and a thickness SR of approximately 0.5 mm to 1 mm. The broad, open interval AR of the margin portions R is preferably 15 mm when the arrangement has the U-shaped cross-section as shown in FIG. 4. Thus, the width BMT is 0.8 to 0.9 times the width LL of the channel VN and the total width AR is approximately 1.5 times the width LL.

Another modification of the protective profile is generally indicated at SP4 in FIG. 5. In this modification, an oval light waveguide maxibundle MB is fastened to a center part MT2, which center part is provided with four reinforcing elements LE.

In a still further modification, a protective profile, generally indicated at SP5 in FIG. 6, has an injection-molded light waveguide strip LWLB attached to a bottom of a center part MT3. The strip LWLB is preferably molded so that it can be easily separated from the protective profile.

In FIG. 7, a protective profile, generally indicated at SP6, has a light waveguide microcable MK fastened to the center part MT3, which has three elements LE.

In an embodiment of the protective profile generally indicated at SP7 in FIG. 8, the profile has a plurality of layers attached in sequence to a center part or portion SMT7. As illustrated, the center part SMT7, like the center parts in the embodiments SP5 and SP6, has reinforcing or longitudinal elements. A layer S1 serves as a dampening or attenuation layer and can consist of physically cellular polyurethane with nodular or spherical hollow spaces which prevent the penetration of water into the longitudinal direction. Thus, the layer S1 is formed of a foam polyurethane and a layer S2 containing wires or light waveguides for transmission purposes is attached thereto. Another layer S3, in turn, is constructed as a protective layer for the layer S2 and, finally, a layer S4 is constructed of polyethylene (PE). This will prevent a microcable, such as MK of FIG. 7, or other material located underneath from pressing through. Instead of wires, glass fibers can be used in the layer S2.

In FIG. 9, yet another embodiment of the protective profile is generally indicated at SP8. This embodiment has flexible margins R8, which protrude from the center part SMT8 in one plane in the form of lamellar flexible strips without any curving or grading. This enables an easy winding of the profile onto a feed drum and the margins R8 will bend upward into a U shape when the profile SP8 is inserted into a channel.

Another modification that provides a protective profile which can be easily wound on the feed drum is generally indicated at SP9 in FIG. 10. The profile SP9 has flexible margins R9 protruding from the center of end surfaces of a center portion MT9 to form a protective profile with longitudinal flexible margins and a center portion.

A fully assembled installation in the channel VN is illustrated in FIG. 11. The channel has been constructed in a street surface SO of an installation base VG. The installed cable K can be seen in the base of the installation channel VN with a protective profile SP10 being arranged above and having its lateral margin portions spreading tightly against the walls of the channel. The hollow spaces of the installation channel VN are filled with filling material, for instance bituminous sand BS. Additional filling agents can also be inserted, which demonstrate a swelling effect when contacted with water and, thus, prevent further penetration of water.

Although various minor modifications may be suggested by those versed in the art, it should be understood that we wish to embody within the scope of the patent granted hereon all such modifications as reasonably and properly come within the scope of our contribution to the art.

We claim:

1. An insertion apparatus for inserting an elongated protective profile over a cable which has been installed in an installation channel, said apparatus comprising a frame, means for moving the frame along the installation channel, a feed drum mounted on the frame for rotation and having an elongated protective profile wound thereon, a press roll mounted on the frame to have a portion extending into the channel to insert the protective profile into the channel, and guide rollers being mounted on the frame adjacent the press roll for guiding the profile into the press roll for insertion into the channel so that the profile is unwound from the feed drum and guided by the guide rollers to the press roll, which inserts the profile into the channel as the apparatus moves therealong.

2. An insertion apparatus according to claim 1, which further includes pre-guides being arranged between the guide rollers and the feed drum.

3. An insertion apparatus according to claim 1, wherein the feed drum is provided with brake means to control the rate of unwinding of the profile.

4. An insertion apparatus according to claim 1, which includes means for inserting a material selected from a group consisting of swelling agents in the form of threads, in the form of fabric and a filling compound for swelling, said means for inserting being arranged for insertion of the material into the installation channel prior to inserting the protective profile.

5. An insertion apparatus according to claim 1, which includes means for inserting a flexible filling compound into the installation channel prior to the insertion of the protective profile.

6. An insertion apparatus according to claim 1, which includes a feed drum with a microcable being arranged on the frame, said microcable consisting of a tube and a light waveguide placed therein, and means for guiding the microcable into the channel prior to inserting the protective profile.

7. An insertion apparatus according to claim 1, wherein the means for moving is a means for self-propelling the apparatus.

8. An insertion apparatus according to claim 1, wherein the means for moving the frame includes a cable installation carriage on which the frame of the installation apparatus is mounted.

9. A protective profile comprising a center portion between two flexible margin portions, said flexible margin portions extending in a flat protruding fashion while in a wound condition on a feed drum, and said flexible margin portions bending in a direction opposite to an insertion direction so that the profile assumes a U-shaped cross-section when inserted into a channel with the center portion being located in a bight portion and the margin portions being the legs extending therefrom.

10. A protective profile according to claim 9, wherein the margin portions extend continuously in one plane from the center portion when the protective profile is wound on the feed drum.

11. A protective profile according to claim 9, wherein the margin portions of the protective profile are provided with transversely extending slits to facilitate winding the profile on a feed drum.

12. A protective profile according to claim 9, wherein the center portion of the protective profile has longitudinal elements selected from electrical wires and light waveguides being embedded therein.

13. A protective profile according to claim 9, wherein the center portion of the profile has a strip of material secured to a lower surface, said strip of material being selected from a group consisting of waveguide maxibundles and light waveguide strips.

14. A protective profile according to claim 9, which includes a center portion having a microcable consisting of a tube and built-in light waveguides being secured to a surface thereof.

15. A protective profile according to claim 9, which includes a plurality of layers secured to the center portion.

16. A protective profile according to claim 15, wherein at least one of the layers contains light waveguides.

17. A protective profile according to claim 15, wherein one layer is constructed as a dampening layer and is formed of a foam plastic material.

18. A protective profile according to claim 15, wherein at least one layer is transversely and longitudinally water-tight.

19. A protective profile according to claim 9, wherein the center portion has a thickness of approximately 3 mm, each of the margin portions have a thickness of between 0.5 mm and 1 mm and a width in a range of 5 mm to 10 mm.

20. A protective profile according to claim 9, wherein the center portion of the protective profile has a width of between 0.8 and 0.9 times the width of the installation channel and the total width of the protective profile has an interval of 1.5 times the width of the installation channel.

21. A protective profile according to claim 9, wherein the protective profile is formed of a material consisting of glass-fiber-reinforced polyester.

22. A protective profile according to claim 9, wherein the protective profile is formed of a material consisting of polyvinyl chloride.

23. A protective profile according to claim 9, wherein the profile is formed of a material consisting of high-density polyethylene.

* * * * *